United States Patent [19]
Zervides et al.

[11] Patent Number: 6,052,674
[45] Date of Patent: Apr. 18, 2000

[54] ELECTRONIC INVOICING AND COLLECTION SYSTEM AND METHOD WITH CHARITY DONATIONS

[75] Inventors: Andronicos Zervides, Reading; Philip Tsappi, London, both of United Kingdom

[73] Assignees: Information Retrieval Consultants (Europe, Middle East, Africa) Limited, Bucks; Information Retrieval Consultants (Worldwide Holdings) Limited, Jersery, both of United Kingdom

[21] Appl. No.: 08/996,789

[22] Filed: Dec. 23, 1997

[51] Int. Cl.$^7$ ..................................................... G06F 17/60
[52] U.S. Cl. ............................................. 705/40; 705/34
[58] Field of Search .................... 705/1, 30, 34, 705/40; 235/375, 379, 380

[56] References Cited

U.S. PATENT DOCUMENTS

| | | | |
|---|---|---|---|
| 5,325,290 | 6/1994 | Cauffman et al. | 705/34 |
| 5,465,206 | 11/1995 | Hilt et al. | 705/40 |
| 5,483,445 | 1/1996 | Pickering | 705/34 |
| 5,621,640 | 4/1997 | Burke | 395/214 |
| 5,638,519 | 6/1997 | Haluska | 705/1 |
| 5,684,965 | 11/1997 | Chancey et al. | 705/34 |
| 5,794,221 | 8/1998 | Egendorf | 705/40 |
| 5,832,460 | 11/1998 | Bednar et al. | 705/40 |
| 5,842,185 | 11/1998 | Chancey et al. | 705/40 |
| 5,884,288 | 3/1999 | Chang et al. | 705/40 |

OTHER PUBLICATIONS http://www.msfdc.com/service/ebpp.asp, Electronic Bill Presentment and Payment.
http://www.firstdata.com/terms.html, Internet Commerce–Credit Card Processing.

*Primary Examiner*—Allen R. MacDonald
*Assistant Examiner*—Forest Thompson, Jr.
*Attorney, Agent, or Firm*—Lumen Intellectual Property Services

[57] ABSTRACT

An electronic commerce invoicing and collection system (EICS) which provides the services of invoicing, automatic "past due" reminders in a real time recorded/registered format is described. Customers of a supplier are encouraged to pay invoices promptly via increased leverage of the supplier, public disclosure of a customer's payment behavior, and donations to charity. An integral part of this invention is accurate payment analysis statistics data that exceeds the detail and timeliness of present systems. The EICS provides a methodology to enable banks to minimize their risk when lending money and save on customer auditing fees. The system and method also provide for bank charges, bank interest payments, factoring charges, and charities to be subsidized by customers who pay their invoices late. The result of such a system and method is customer payment behavior modification.

34 Claims, 13 Drawing Sheets

ELECTRONIC INVOICING AND COLLECTION SYSTEM AND METHOD WITH CHARITY DONATIONS

BACKGROUND

1. Field of Invention

This invention relates to an electronic invoicing and collection system and method (EICS) which provides the services of invoicing, facilitating enforcement of customer payment on behalf of the supplier, compiling detailed customer payment histories, and a method of encouraging customers to pay invoices promptly via increased leverage of the supplier, public disclosure of customer payment behavior, and a charitable aspect.

2. Description of Prior Art

A serious problem that disrupts the financial stability of many small businesses is that of late payment by customers. For example, independent contractors—who have a 10% survival rate in their first two years—have been recognized as victims of late payment by their customers. In the U.K., one report on small to medium sized enterprises (SME) cites late payment as a major problem, and another survey revealed that 20% of small firms were threatened with business failure specifically due to late payment. Although late payment is a problem for businesses of any size, small to medium sized enterprises suffer from the lack of legal and financial leverage against their larger counterparts. It is often SMEs, with their less flexible levels of working capital, who suffer the most.

In an investigation of the causes of late payment, it was found that intentional delay occurred in 35% of the cases. This behavior is often adopted by large corporations who carry many outstanding invoices. Payment delay works in two primary ways to benefit the customer: by (1) increasing the working capital of the customer; and (2) providing significant interest earnings on the floating funds. The result is an unethical method of financial gain for the customer at the expense of the supplier. In the U.K., this float amount is approximately £20 billion.

In the United States, the impact of late payments is particularly great in the private health care industry, where HMOs and insurance companies routinely pay claims 90 to 120 days late in order to "pay the float". In New York state, one HMO accumulated $238 million in outstanding late payments to health care providers with devastating effects to patients, physicians, and hospitals. Cancer patients were forced to buy their own drugs, and health care providers had to turn away patients, cut back on services, and delay building expansions due to the lack of working capital. It has been found that some of the largest HMOs are the slowest payers, with the three largest together reporting $3.23 billion in accounts payable to hospitals, doctors, and other medical providers at the end of 1996. A settlement with one of the three HMOs was reached only after an aggressive state investigation and a settlement with the Attorney General.

Such behavior is not accepted for customers who are individuals and small businesses in present society. Large corporations, who have ample resources to obtain payment from their customers, have the necessary leverage to enforce payment of invoices and interest charges. As a deterrent against poor payment behavior, companies are able to give customer "bad credit". For example, a utilities company can turn off the electricity or phone service to a customer who fails to pay in a timely manner. Companies with such significant leverage are in the position to enforce strict payment policies on their own terms. The power to designate "bad credit" standing to a corporate customer is not available to individuals, nor are small entities able to make demands to larger companies in ways that enforce payment effectively.

Because large companies have significant resources and well developed electronic information systems, various electronic systems have been developed to simplify payment processing by individual customers to large vendors. For example, U.S. Pat. No. 5,465,206 to Hilt et al. (assignee: Visa International) describes a bill pay system designed for individual customers to pay their bills through a payment network. The Electronic Bill Presentment and Payment (EBPP) service by Microsoft and First Data Corp. integrates banks, billers, and customers through the internet. The EBPP system consolidates bills from a plurality of suppliers for the customer, who may then authorize payment through his or her bank at any time. U.S. Pat. No. 5,483,445 to Pickering (assignee: American Express TRS) describes an automated billing system which consolidates a plurality of company charges for a customer, collects all payments from the customer, and distributes payments to each company. In each case, the systems are designed to facilitate timely payment receipt for large companies, and makes the bill payment process more convenient for individuals.

Electronic systems to ease the payment process for large corporations are in effect, through electronic data interchange (EDI) systems. Using EDI, payments can be made on a timely basis; however, the software is relatively sophisticated and expensive, and thus it is not feasible for many SMEs or individuals to use EDI. Small firms who are able to afford EDI still do not benefit from timely payment from a noncompliant customer, because EDI systems do not provide for any method of payment encouragement or enforcement. EDI systems are used primarily for payment between large companies who have established customer/supplier relations and are often mutually dependent.

SME suppliers often use debt collecting agencies or lawyers to collect payment from a large customer. Although both methods are expensive and time and labor intensive, these types of providers are often the only recourse when a SME needs to collect payment from an uncooperative customer. When the customer is a large corporation, however, the individual or SME is still at a disadvantage. Larger companies can afford substantial legal defense against the smaller entity, thereby maintaining their leverage. Thus hiring a debt collector or lawyer is not always successful nor financially sound for a SME.

Some SMEs wish to avoid jeopardizing the supplier-customer relationship with aggressive collection techniques, and attempt collection themselves. This results in a diversion of management time which would otherwise be spent developing the business itself. This loss in management time starts a downward spiral as both time and funding for investment and growth are lost.

Suppliers often lack effective credit management systems and are thus lenient toward customer payment. In hopes of receiving at least the original invoice amount, the supplier often overlooks the late payment and does not enforce collection of surcharges, even when payment due dates and late payment penalties were previously agreed upon. Customers are able to use the excuse "I never received the bill", or "I sent the payment; didn't you get it?" if there is obviously no way to track invoicing and payment receipt. A small supplier thereby becomes vulnerable to excuses and delays.

Legislation in the U.S. and several European countries provides for statutory rights to interest on late payments.

Nevertheless, the problem still exists. This is especially true for small businesses who lack the resources, information systems, and leverage to track and enforce collection of fees. Often, the fees are very small—for example $5.00—and it becomes uneconomical for a small business to put in the required effort to collect small amounts from many different customers. This results in a loss of a large amount of potential income from the sum of many small fees that would accumulate if collection were feasible. Large companies, on the other hand, have ample resources to "nickel and dime" a multitude of customers. Their leverage in collecting these fees manifests itself in their ability to affect a customer in a significant way, such as destroying an individual's credit standing or turning off a utility. Another hindrance to the effectiveness of statutory collection of interest is that many corporations force extension of credit periods, for example from 30 to 90 days, thereby leaving the supplier in the same situation of delayed payment. Recognizing this problem, at least one statutory right to interest proposal in the U. K. includes the right to pursue interest on a late payment for up to six years. Even so, the collection of this interest still could require legal action that may not be cost-effective for a small firm.

One proposal that has arisen in the U.K. is a requirement for all large companies to include their own payment records in their annual reports. Currently, this practice is voluntary. Public disclosure of poor payment records could be enough incentive for companies to improve their behavior, but this proposal does not provide a system for complete, objective disclosure of payment records. In its own report, a company could present the data cleverly and intentionally mislead interpretation while still heeding the disclosure requirement.

A voluntary payment charter has been implemented in the U.K. through which companies can make a "terms of trade" commitment and pledge to quickly address payment delay problems. The reward for becoming a signatory is permission to use the Voluntary Payment logo, a relatively weak point compared to the financial gain available when a customer withholds payment. While this charter has good intentions, it holds no legal weight nor does it provide significant incentive for large corporations to sign the charter and abide by its rules.

Islamic laws of economics prohibit terms of sale that include interest or late payment charges. The exception to this law is the case where the customer is deemed financially capable of paying, yet refuses timely payment. In such a case, once payment is late, the supplier is entitled to compensation. A late payment fee may only be included in the terms of sale in order to deter late payment from a financially capable customer, as long as the fee is allocated to works of charity or the general welfare of society. While this law attempts moral enforcement, it does not provide systems and methods that help SMEs collect payment from customers, especially large corporations.

Ineffective payment collection is a major cause of another problem facing small businesses: that of receiving financing. The biggest cost to financial institutions when dealing with small business loans is debt from failed businesses, failure that is often caused by lack of customer payment. The inconvenience of auditing small business accounts is another significant deterrent for approval of small business loans. This situation presents another case where a small company is put to disadvantage due to ineffective customer payment collection and subsequent lack of resources.

OBJECTS AND ADVANTAGES

It is a general object of the present invention to provide an improved method for encouraging timely invoice payment by a customer to a supplier.

It is another general object of the present invention to provide a system which facilitates late payment penalty collection from a customer.

It is a further general object of the present invention to create a system which ultimately leads to improved payment behavior by a customer.

It is a further object of the present invention to provide leverage for a small business when collecting payment from a customer.

It is a further object to create moral, legal and marketing incentives for customers to pay suppliers in a timely manner.

It is a further object of this invention to provide a system and method for generating a database of detailed customer payment histories.

It is still a further object to create a source of funds for charitable organizations by virtue of the present invention.

The current invention seeks to provide solutions to several of the aforementioned problems. By virtue of the electronic invoicing and collection system (EICS), a SME is given needed leverage to collect funds from customers who otherwise would be inclined to pay on their own terms.

This invention is particularly advantageous over other invoicing and collection systems because it involves a method of encouraging payment through a third party who monitors all invoicing and payment activities between businesses. The enforcement of surcharge collection comes from various key aspects: (1) making a customer's payment record public; (2) evaluating credit risk of customers from the detailed payment histories; and (3) donation of a portion of the surcharge to a charity.

By serving as the main invoicing and collection service for all business transactions between a customer and a supplier, the EICS has access to complete payment records of a customer with a given supplier. These payment records are distributed publicly, serving as payment incentive if a delinquent company is concerned about bad publicity. In addition, the EICS database of customer payment records provides means for accurately assessing the credit worthiness of a given business. Thus any size business can obtain a poor credit rating, and strict credit terms can be assigned for problematic customers. By donating a portion of late payment surcharges to charity, an ethical issue is brought into late payment. A customer is more inclined to follow through with surcharge payment because refusal to pay the surcharge could be construed as withholding funds from a charitable organization. The results of these payment incentives include expedited business transactions, increased income security for suppliers (notably, small businesses and self-employed individuals), and payment behavior modification of customers.

Another advantage of this invention is that the EICS relieves suppliers of the burdensome duty of invoicing, reminding, and collecting. The EICS is designed to alleviate customer-supplier tension that arises when a supplier must continually demand payments from a customer and tries to enforce collection of late payment surcharges. In addition, valuable business management time is lost when attention is diverted to chasing uncooperative customers. The present invention provides an active third party which monitors invoice receipt and payment collection and provides for enforcement of payment terms, making excuses such as "I never received the bill" and "I sent my payment already" difficult to prove.

Another advantage of the invention is that the EICS allows smaller firms to benefit from statutory right to interest legislation that includes the right to pursue interest for many years—up to six years in a recent U.K. proposal—after it was incurred. Without EICS, many small firms are unlikely to use such rights because of fear of losing customers by taking them to court. By maintaining detailed payment records and late payment surcharges, the EICS enables small firms to enforce late payment surcharges at a later date; for example, when they can afford to lose the customer. The EICS further encourages timely payment behavior by turning small debts owed to small suppliers into long term liabilities owed to a larger, publicly visible, charitable entity who could pursue the aggregated debts of many small suppliers when the sum becomes large enough to make prosecution cost effective.

Another important attribute of the system is its low cost, especially if surcharges are accrued. The surcharge may be based on a percentage of the outstanding balance, and/or a predetermined minimum amount, for example $10.00. The portion of a surcharge allocated for processing costs may be applied toward a supplier's EICS account which would allow a supplier to use the EICS free of charge. The low cost of using EICS is significant because it increases the effectiveness of collecting surcharges for small businesses who do not have large information systems. By using EICS, collection of small fees from many different customers becomes as cost effective for a SME as it is for a large company. This increase in leverage enables small businesses to demand surcharge payment with the same presumptions as large companies.

The invention provides an easy-to-use and inexpensive internet-based system that aims to solve the problem of business suppliers having difficulties in collecting customer payment. By providing consistent rules and means for facilitating payment enforcement, the EICS assists suppliers with invoicing and payment collection from businesses of any size. By virtue of the invention, a detailed customer payment history database will be compiled; invoicing procedures and credit assessment will be simplified for businesses and financial institutions; payment incentives for customers will be provided; and a source of charity funds will be made possible.

SUMMARY OF THE INVENTION

The objects of the invention are achieved by providing a system and method of electronically invoicing customers on behalf of suppliers and a method of facilitating payment enforcement of invoice and late payment surcharges. Steps of the method include compiling and assessing customer payment records, making customer payment records available to the public, and donating a portion of the surcharge to a charitable organization. These aspects are incorporated into all embodiments of the invention. In a preferred embodiment of the invention, the electronic invoicing and collection system (EICS) operates in conjunction with a participating financial institution and the EICS mediates fund transfers between the supplier's bank and a customer's bank.

A supplier who provides a service for a customer enrolls in the EICS, an entity which provides the role of communicating with the customer regarding the supplier's invoices and tracking payment transfers. The EICS forwards the invoice to the customer which states payment amounts, terms of payment, due date, and applicable surcharges when payment is made late.

In one embodiment, the customer pays the original payment amount and any applicable surcharges to the EICS who distributes the funds accordingly. In another embodiment, the customer pays the original amount directly to the supplier and pays the surcharge to the EICS. In yet another embodiment, the customer pays both the original bill amount plus applicable surcharges to the supplier. As governed by the rules of the system, the supplier forwards a portion of the surcharge to charity. In still another embodiment, the customer pays the original payment amount to the supplier and pays a portion of the surcharge directly to charity. In still another embodiment, the customer pays the original payment amount to the EICS and pays a portion of the surcharge directly to the charity.

In all of the aforementioned embodiments, the customer has the option of paying the original invoice amount before the specified due date, in which case no surcharges will apply. All embodiments also include communication between the supplier, customer and charity with the EICS such that the EICS is informed of all payments that bypass EICS. Once payment has been verified, the EICS records payment behavior of the customer. This step is followed by compilation of the customer's payment record and subsequent use thereof, such as credit risk assessment and/or public distribution of a customer's payment behavior.

The surcharge that is charged to the customer is distributed as follows: (1) to cover costs of running EICS; (2) to fees and interest charged by the financial institution; (3) to the supplier as an inconvenience reimbursement; and (4) to a charitable organization. The breakdown of surcharge disbursement could be made on a case-by-case basis or according to a predetermined formula.

The system of the present invention is comprised of elements which allow electronic transmission of invoices, messages, and financial transactions between the EICS, the supplier, and the customer. An embodiment of the system comprises a central computer which processes all invoices and calculates surcharges, sends and receives electronic messages through a global network, mediates fund transfers, and stores invoice records and payment records. Electronic messages serve as the primary method of transmitting information between the EICS central computer and supplier, customer, and participating bank computers. In the preferred embodiment, the EICS is licensed by a financial institution as a server which operates as a EICS/bank cooperative system (EICS/BCS). The preferred embodiment of the system also includes remote computers for human data entry and inquiry and a remote computer for security purposes which are coupled to the central computer with an internal network system. Since it is not expected nor necessary that charitable organizations have access to a global electronic communications network, conventional methods of communication (phone, mail, facsimile) can be used. By monitoring all invoices and payments, the EICS is able to generate complete payment records for each customer in real time. The EICS also monitors and documents A/R for suppliers, thereby making these records easily accessible to the supplier's financial institution for auditing purposes. In addition, the system records each donation made to charitable organizations, serving as a database for charity fund collection records.

DETAILED DESCRIPTION OF THE DRAWINGS

Figure 1:
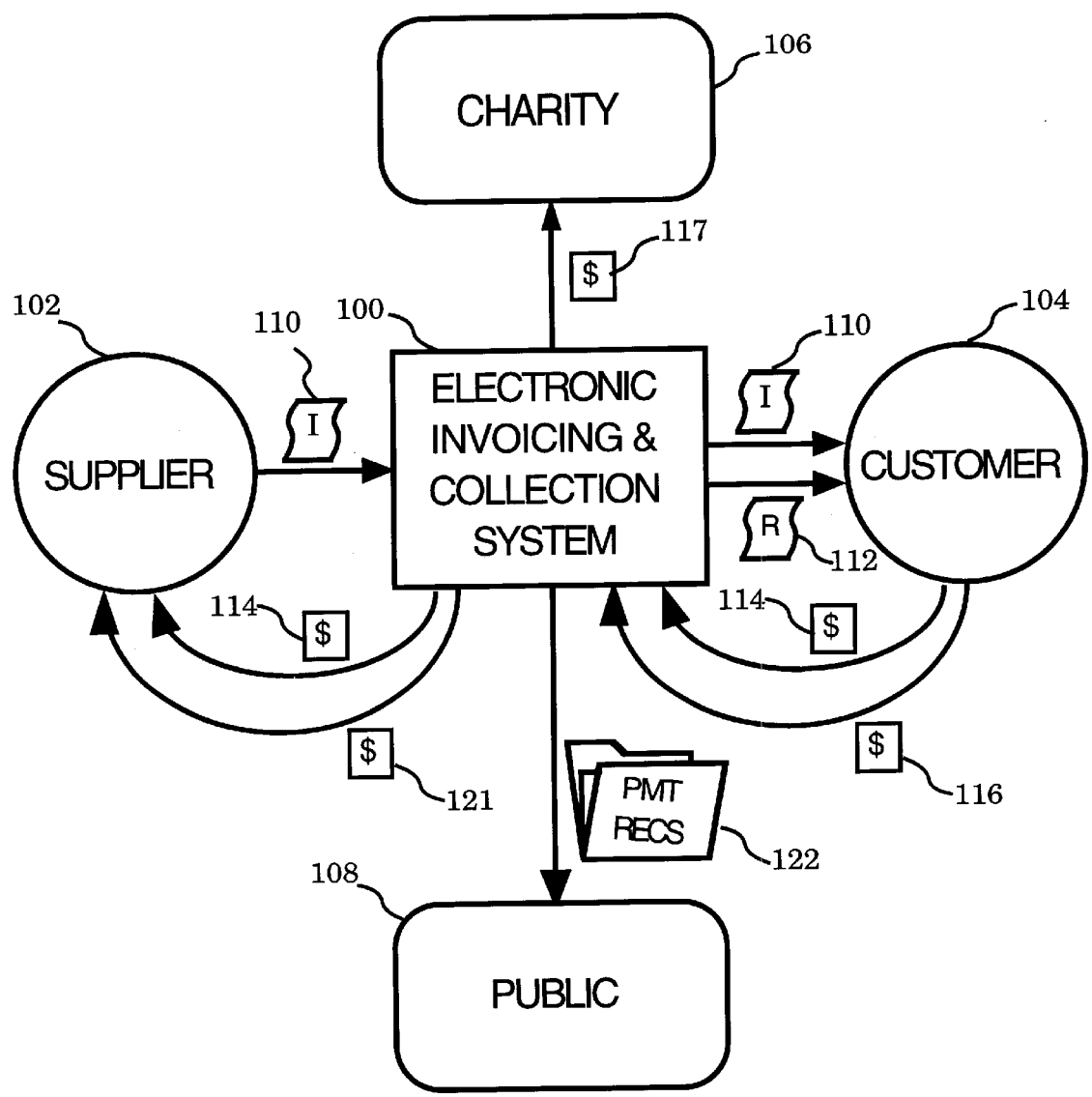
FIG. 1 is a block diagram illustrating the first embodiment of the method.

The present invention describes a system and method for electronically invoicing and collecting payments, and incorporates a charitable aspect, generation of detailed customer payment records, and public disclosure of payment behavior. The method provides incentive for customers to make timely payments and to pay late payment surcharges to their suppliers, and the system of the invention provides a convenient format for communication, data processing, and financial transactions between entities. The system and method are applicable to supplier and customer businesses of any size.

Various embodiments of the method of the electronic invoicing and collection system (EICS) 100 are depicted in FIGS. 1–5. A flowchart showing the steps of this embodiment is depicted in FIG. 6. EICS 100 is utilized by supplier 102 when supplier 102 has provided or is actively providing a service to a customer 104. Supplier 102 becomes a participant of the method governed by the EICS 100 by enrolling in the service, which operates in conjunction with a financial institution in the preferred embodiment shown in FIG. 12. As a participant, supplier 102 is informed of services offered by the EICS 100, and agrees upon the system rules. Supplier 102 chooses charity 106 from a list of current, valid charitable organizations, or supplier 102 allows EICS 100 to select to which charity 106 a portion 117 of surcharge 116 are allocated.

In the five embodiments illustrated by FIGS. 1–5 and the flow charts of FIGS. 6–10, the method is initiated by the transfer of invoice 110 from supplier 102 to EICS 100 via the internet or facsimile. Invoice 110 includes all information relevant to services rendered by supplier 102 for customer 104, including but not limited to a balance owed to supplier 102 by customer 104, a payment due date, terms of payment such as a description of the penalty to be implemented in the case of late payment, and instructions to make payment. The penalty is a surcharge 116 whose amount may be based on a percentage, for example 2%, of the unpaid balance.

EICS 100 forwards invoice 110 to customer 104 via the internet and awaits payment of invoice amount 114. In each embodiment, the transfer of funds from one entity (e.g., customer 104) to another (e.g., supplier 102) may occur through a financial network run by EICS 100 or through financial networks run by the banks which service customer 104 and supplier 102. Thus, an arrow indicating payment from customer 104 to supplier 102 means not only that payment was made directly, for example in person, but it is also possible that funds were transferred between the bank account of customer 104 to the bank account of supplier 102 by means of electronic transfer, check, cash, or any other payment means available to customer 104.

Figure 13:
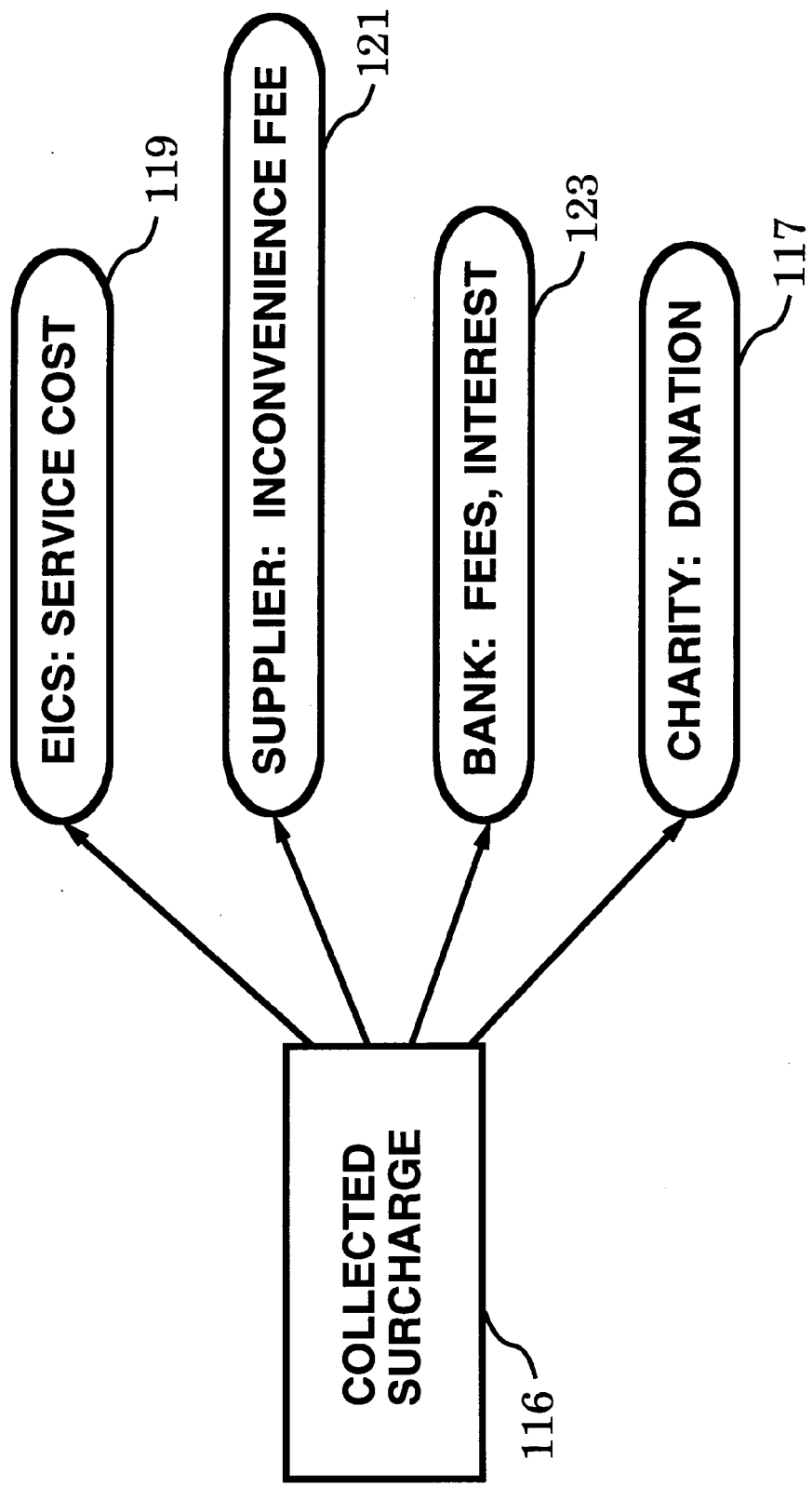
FIG. 13 is a flow diagram illustrating the distribution of collected surcharges.

In the first embodiment, depicted by the diagram in FIG. 1 and the flow chart of FIG. 6, customer 104 has the option of making payment amount 114 on time to EICS 100. EICS 100 then forwards payment amount 114 to supplier 102. Alternatively, customer 104 does not pay amount 114 before the due date. In this case, EICS 100 determines surcharge 116 that customer 104 owes in addition to original payment amount 114. EICS 100 sends reminder notice 112 to customer 104, stating the total amount due, i.e., original invoice amount 114 plus surcharge 116. If customer 104 continues to refuse payment, EICS 100 continues to calculate surcharge 116 for each billing cycle and includes this information in reminder 112 sent to customer 104. In addition, EICS 100 updates the customer's payment behavior record 122 and makes such behavior public domain 108. In this embodiment, if customer 104 finally pays according to the terms of invoice 110, customer 104 pays both original payment amount 114 in addition to surcharge 116 to EICS 100. EICS 100 then forwards invoice amount 110 to supplier 102 and allocates surcharge 116 as per FIG. 13. Surcharge 116 is broken into a portion 119 to pay for service costs of EICS 100, a portion 121 that goes to supplier 102 as an "inconvenience reimbursement", a portion 123 that covers bank fees and/or interest charges, and a portion 117 that is donated to a charitable organization 106. In all embodiments, this is the method of disbursing surcharge 116. Following completed transactions for invoice 110, EICS 100 reports payment behavior in the customer's payment record 122.

Figure 2:
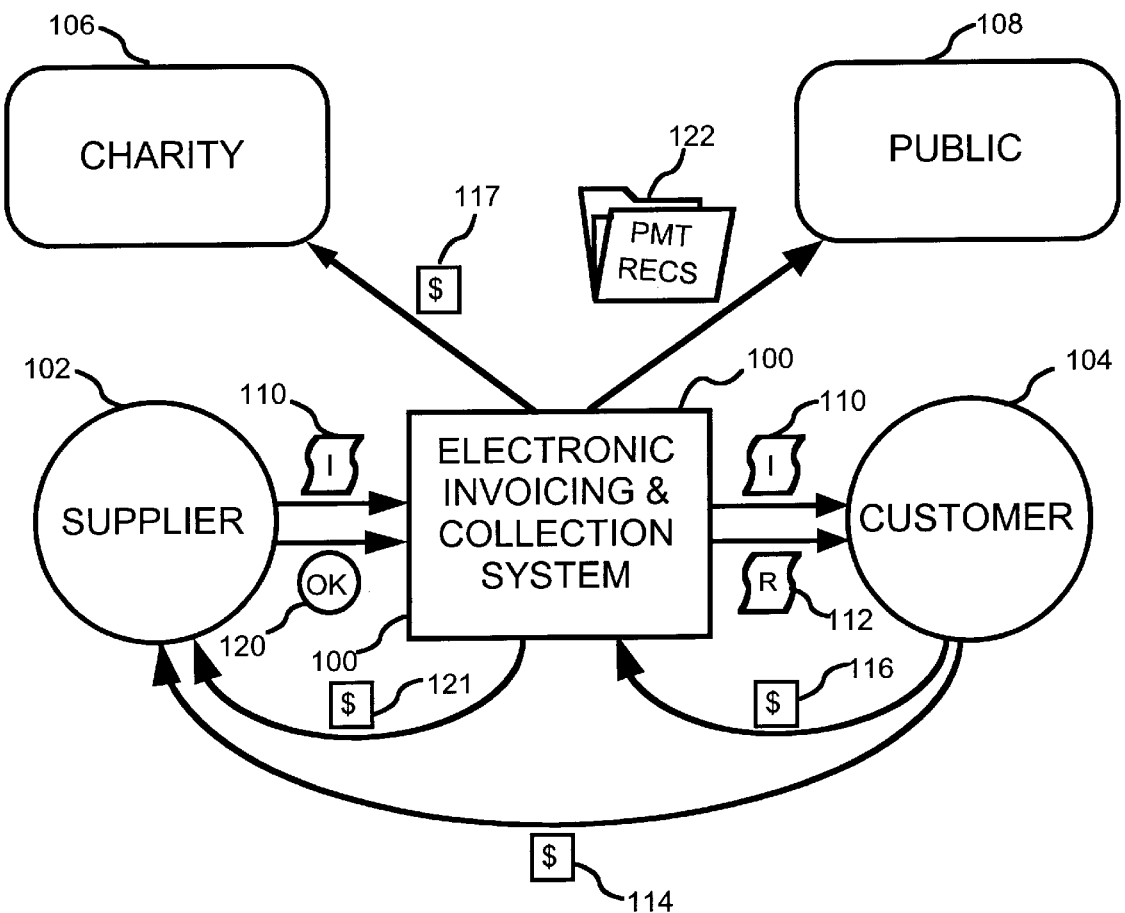
FIG. 2 is a block diagram illustrating the second embodiment of the method.
Figure 7:
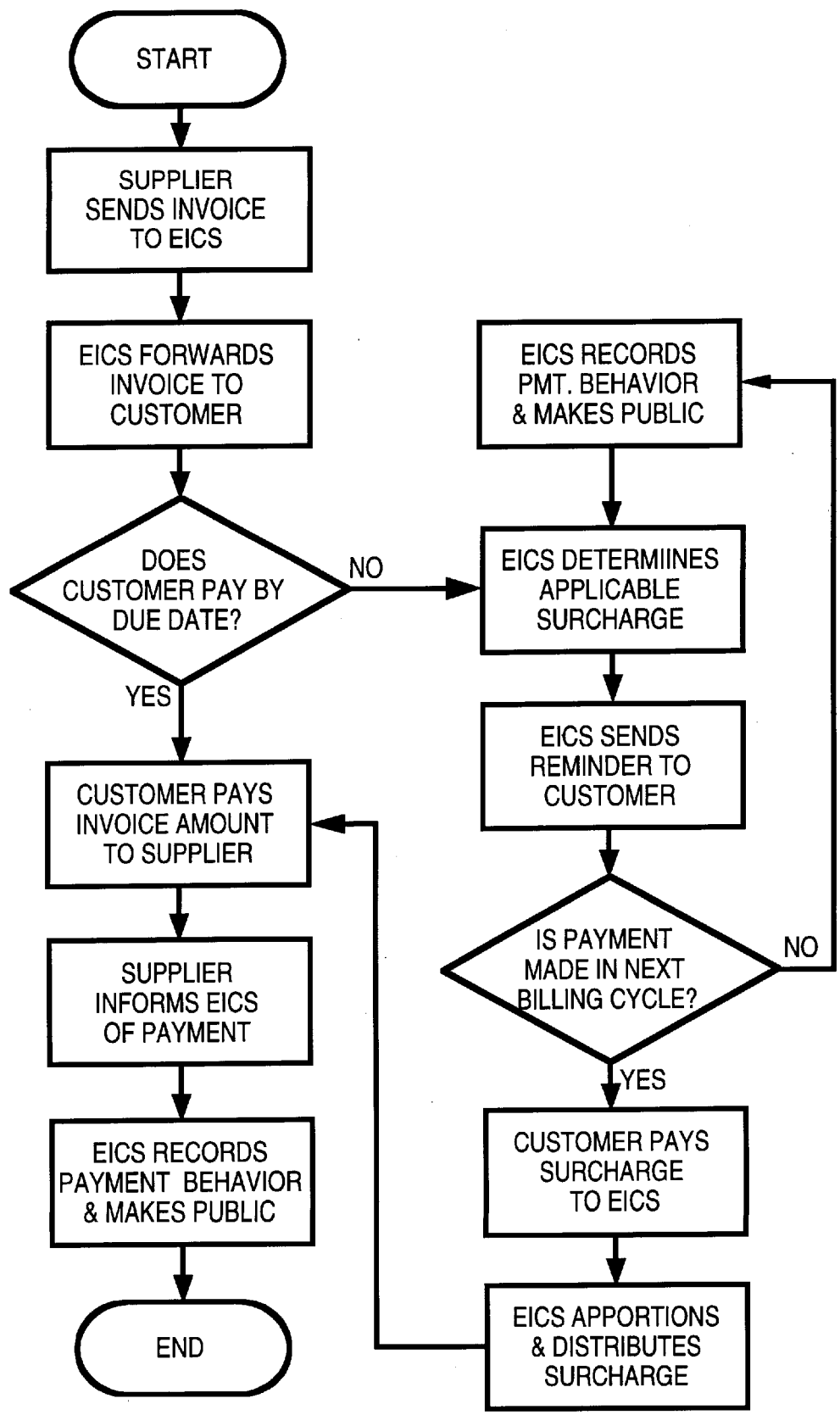
FIG. 7 is a flow chart showing the steps of the second embodiment of the method.

In another embodiment, such as that depicted in the diagram of FIG. 2 and the flow chart of FIG. 7, the initial invoicing steps are followed as described in the first embodiment wherein 106, 108, 110, and 121 are the same as described for FIG. 1. The steps followed in the case of nonpayment, i.e., calculating surcharge 116 and sending reminder notice 112, are also identical to the first embodiment. This embodiment differs in that customer 104 pays original payment amount 114 to supplier 102 directly. In the case of late payment by customer 104, and then customer 104 eventually pays according to reminder notice 112, customer 104 pays original payment amount 114 to supplier 102 and pays surcharge 116 to EICS 100. Verification 120 that supplier 102 received payment amount 114 is received by EICS 100. EICS 100 disburses surcharge 116 according to FIG. 13, and allows the customer's payment behavior records 122 to become public knowledge.

Figure 3:
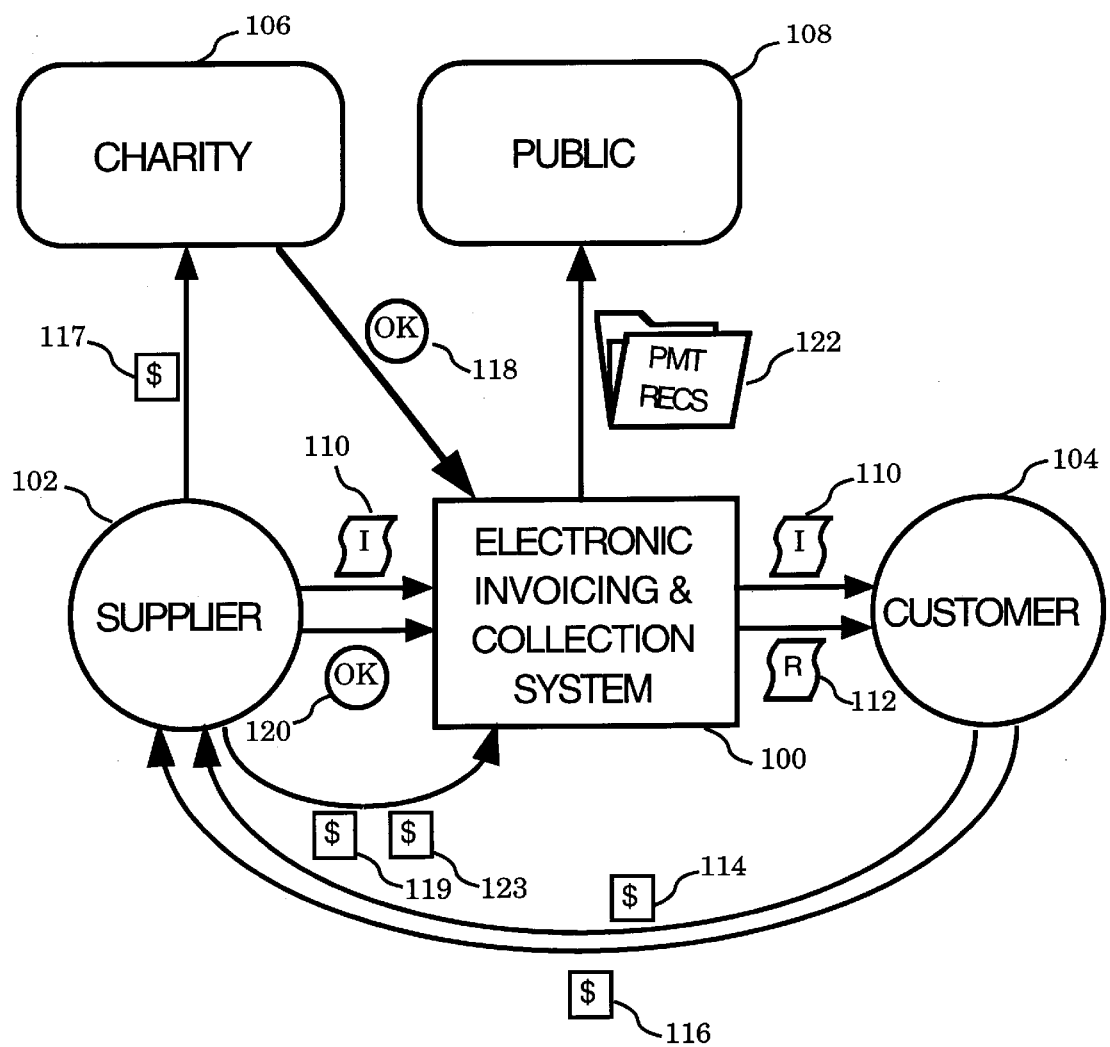
FIG. 3 is a block diagram illustrating the third embodiment of the method.
Figure 8:
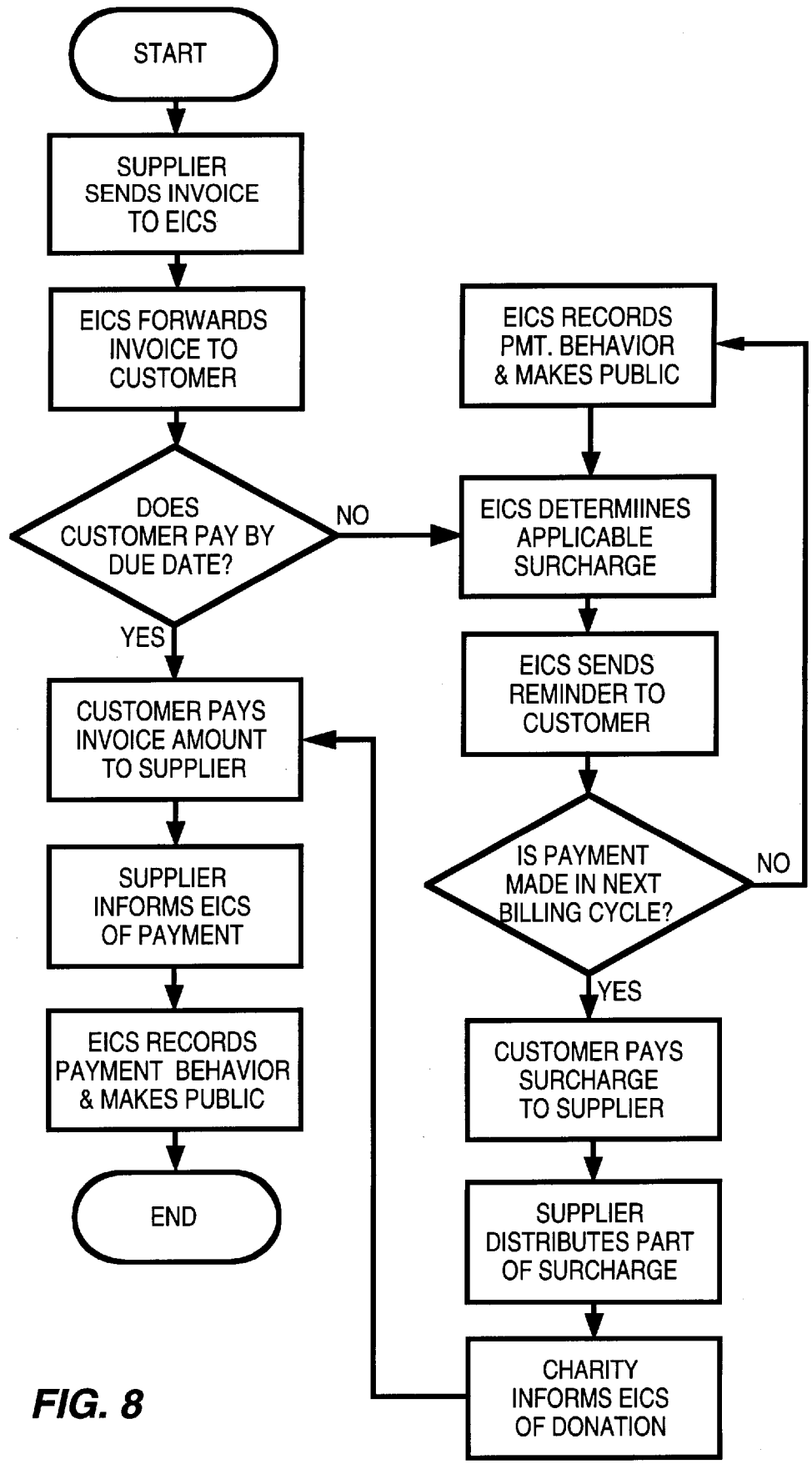
FIG. 8 is a flow chart showing the steps of the third embodiment of the method.

FIGS. 3 and 8 depict an embodiment, wherein 110 is the same as described for FIG. 1 and in which, following the initial invoicing steps, customer 104 bypasses EICS 100 and (in the case of prompt payment) pays invoice amount 114 to supplier 102. The steps followed in the case of nonpayment, i.e., calculating surcharge 116 and sending reminder notice 112, are also identical to the first embodiment. In the case of late but eventual payment, customer 104 pays invoice amount 114 and surcharge 116 to supplier 102. Supplier 102 donates portion 117 of surcharge 116 to charitable organization 106. Supplier 102 sends verification 120 of receipt of payment 114 to EICS 100, and charity 106 sends verification 118 of receipt of donation 117 to EICS 100. Supplier 102 pays portion 119 of surcharge 116 to EICS for use of the service, and portion 123 of surcharge 116 is used to cover bank fees and/or interest charges. In all figures, bank fees 123 includes but is not limited to bank fees, interest charges, factoring charges, invoice discount charges, or loss of interest in the bank account of supplier 102. EICS 100 records the customer's payment behavior and makes records 122 available to public domain 108.

Figure 4:
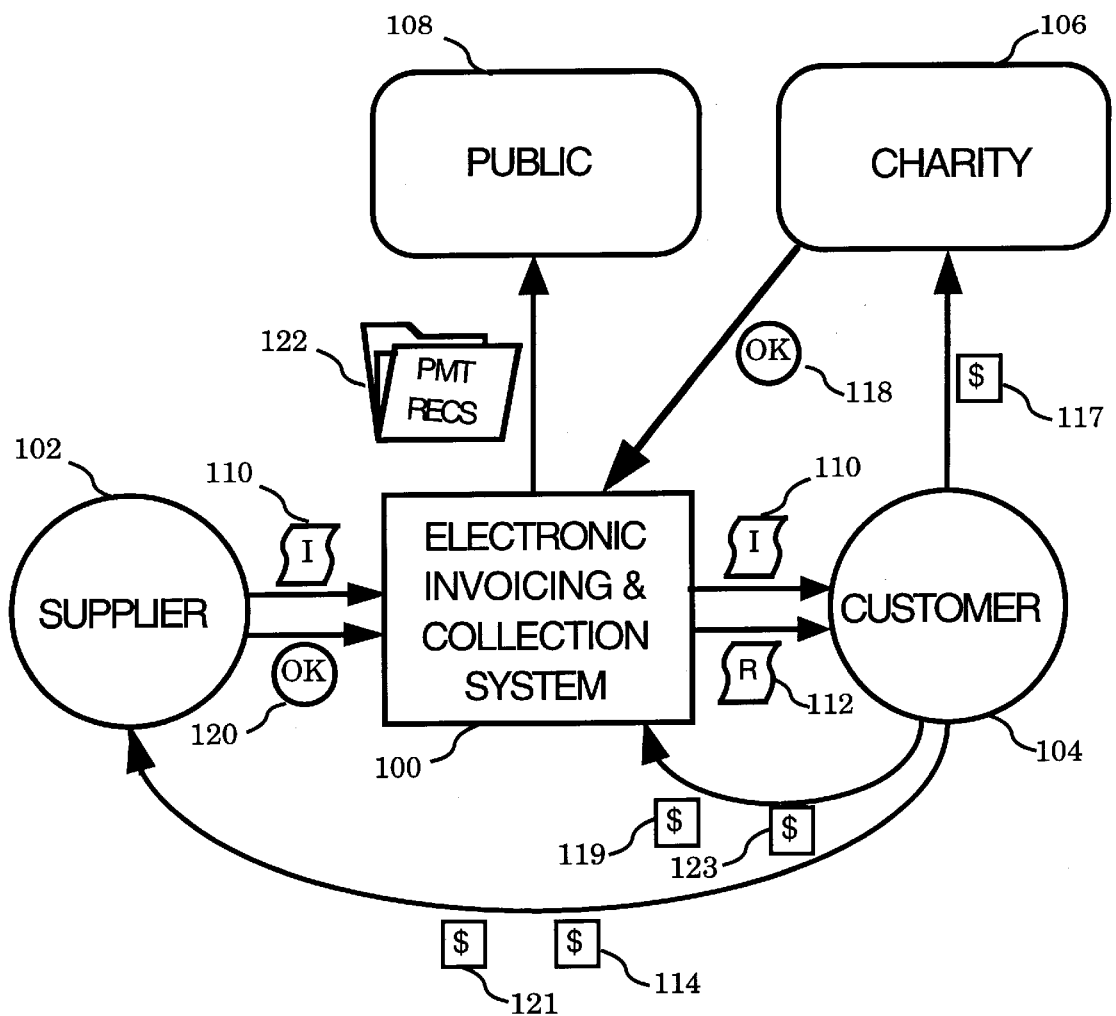
FIG. 4 is a block diagram illustrating the fourth embodiment of the method.
Figure 9:
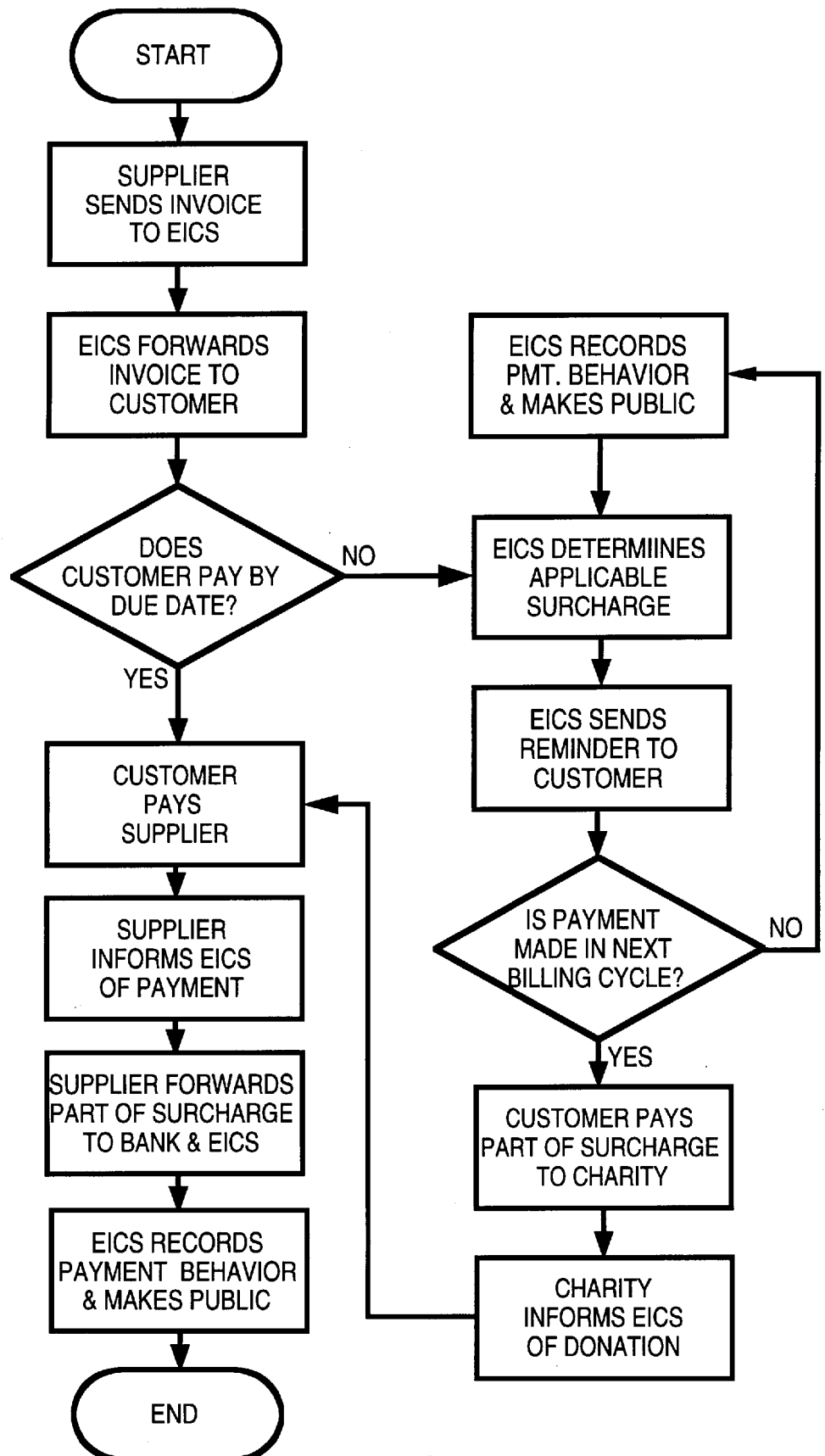
FIG. 9 is a flow chart showing the steps of the fourth embodiment of the method.

FIGS. 4 and 9 depicts an embodiment, wherein 108 and 110 are the same as described for FIG. 1 and in which the initial invoicing steps as described above are followed, after which (in the case of timely payment) customer 104 pays invoice amount 114 to supplier 102. This embodiment differs from other embodiments described above in the case where customer 104 fails to make payment on time, accrues surcharge similar to surcharge 116 shown in FIG. 3, but eventually makes payment. Following the steps of EICS as shown in FIG. 9 calculating surcharge 116 and sending reminder notices 112 for each billing cycle, customer 104 pays invoice amount 114 to supplier 102 and portion 117 of surcharge 116 to charity 106. In order for customer 104 to be relieved of further notices 112 and accrued surcharges 116, EICS 100 must receive verification 120 from supplier 102 stating that invoice amount 114 was received, as well as verification 118 from charity 106 stating that portion 117 of surcharge 116 had been donated to charity 106. Portion 121 of surcharge 116, the inconvenience fee, is included with payment amount 114 made to supplier 102. Portion 119 (EICS 100 service costs) and portion 123 (bank fees) of surcharge 116 are then paid to EICS. All payments and transactions are monitored by EICS 100 so that customer's payment record 122 can be updated and made available for public use.

Figure 5:
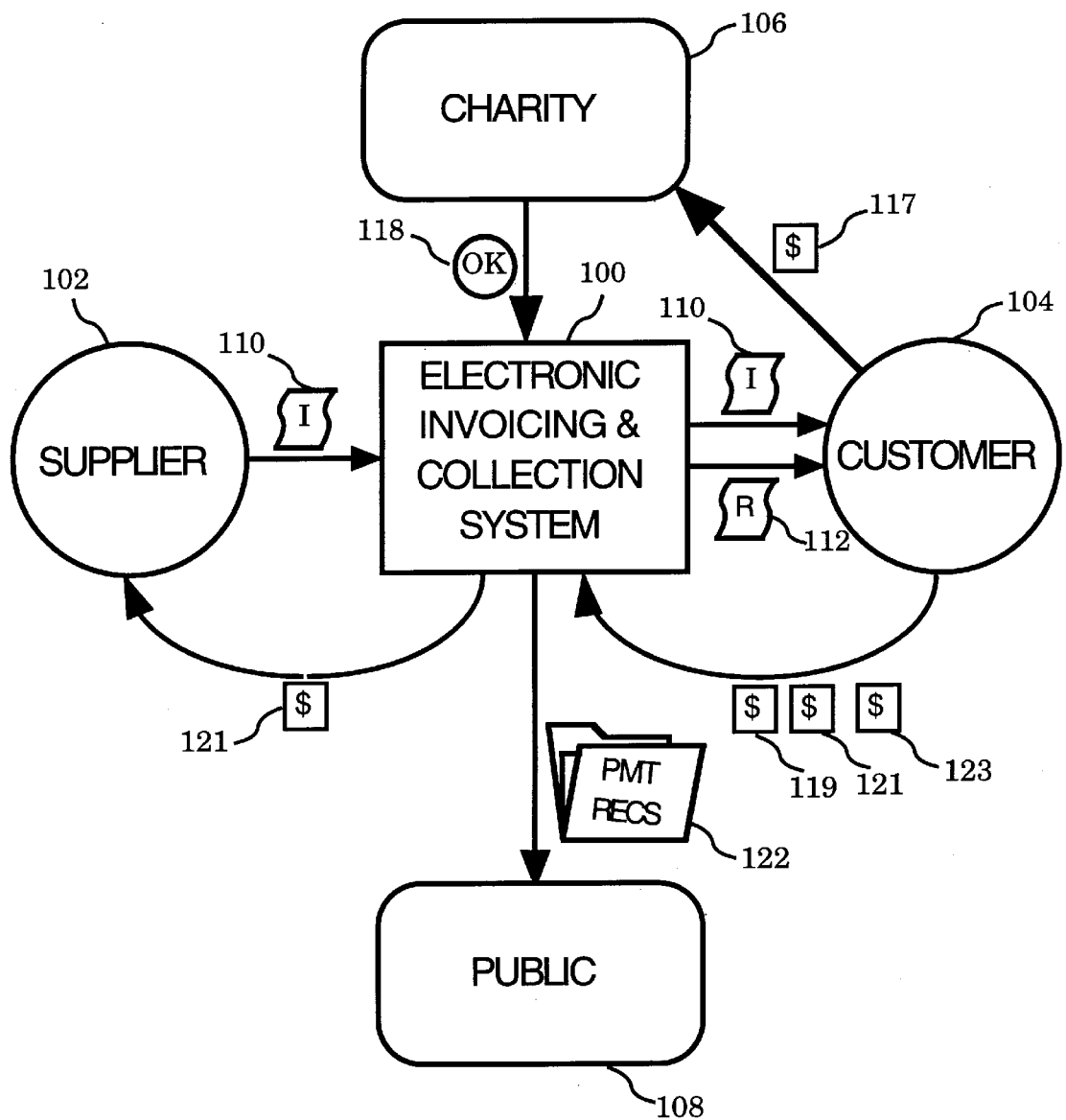
FIG. 5 is a block diagram illustrating the fifth embodiment of the method.
Figure 6:
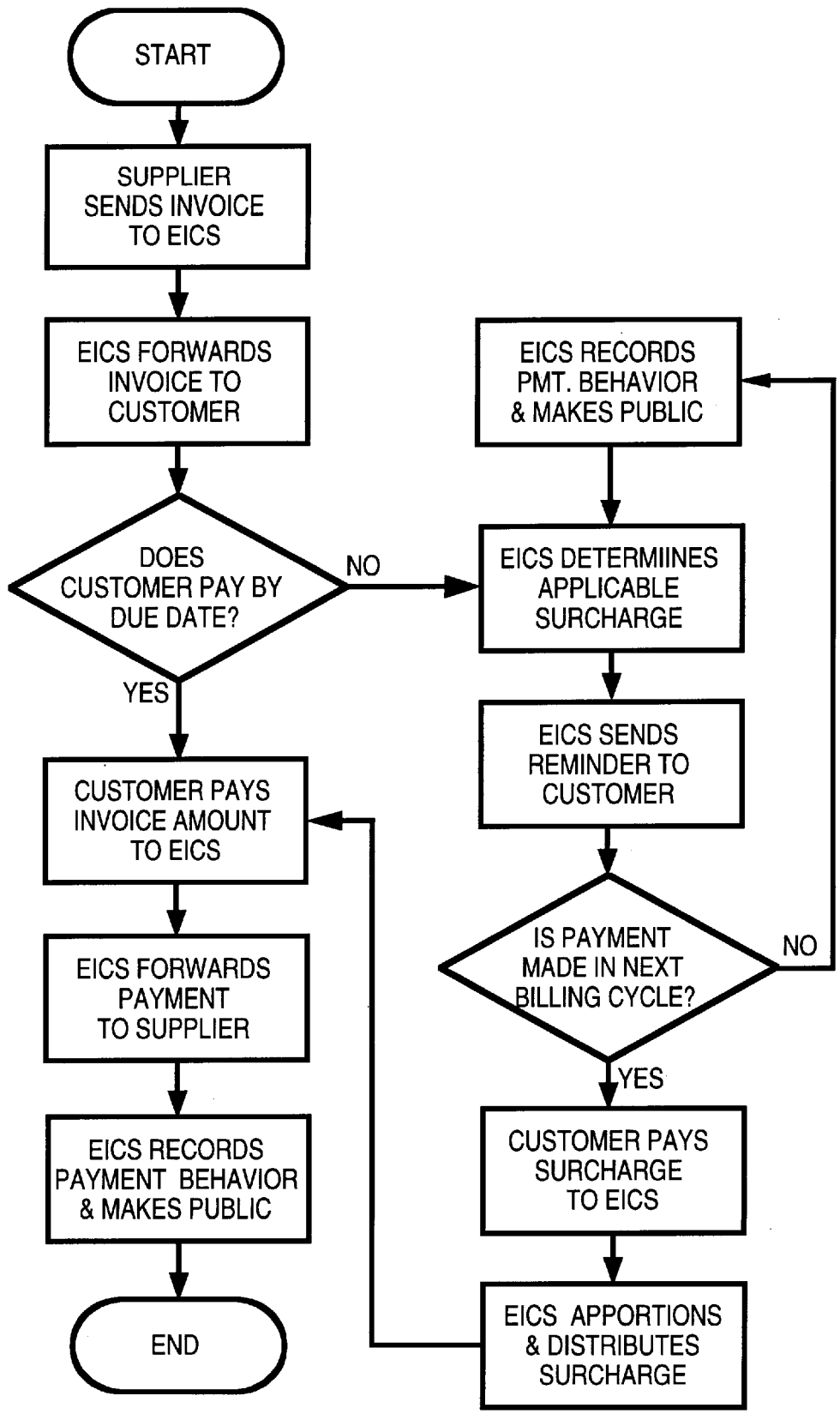
FIG. 6 is a flow chart showing the steps of the first embodiment of the method.
Figure 10:
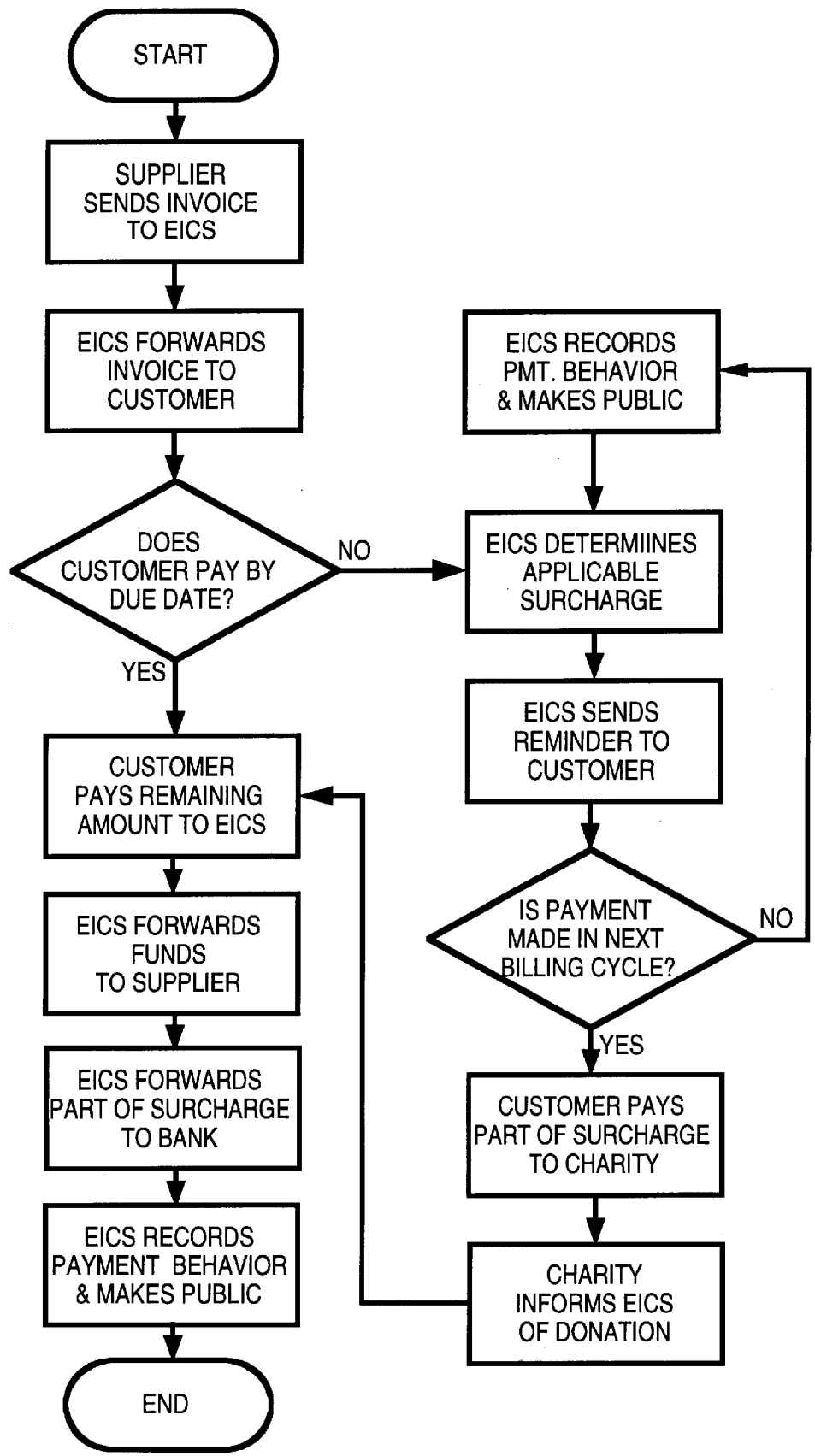
FIG. 10 is a flow chart showing the steps of the fifth embodiment of the method.

In a further embodiment, depicted in FIGS. 5 and 10, wherein 108 and 110 are the same as described for FIG. 1, the initial invoicing steps are followed as per all other embodiments. In the case of timely payment, customer 104 pays invoice amount 114, as shown in FIG. 3, to EICS 100 and EICS 100 forwards invoice amount 114 to supplier 102. In the case of late payment, the steps of calculating surcharge 116, as shown in FIG. 3, and sending reminder notices 112 are followed as described in the former embodiments. In this embodiment, when customer 104 eventually pays after the due date, customer 104 pays invoice amount 114 to EICS 100 and EICS 100 forwards invoice amount 114 to supplier 102, and customer 104 pays portion 117 of surcharge 116 directly to charity 106. The remaining portions 119, 121, and 123 of surcharge 116 are included with payment amount 114 made to EICS 100 so that EICS 100 can disburse the funds appropriately. Verification 118 from charity 106 stating that portion 117 of surcharge 116 was donated is sent to EICS 100 so that customer's payment record 122 can be updated and made public knowledge.

Figure 11:
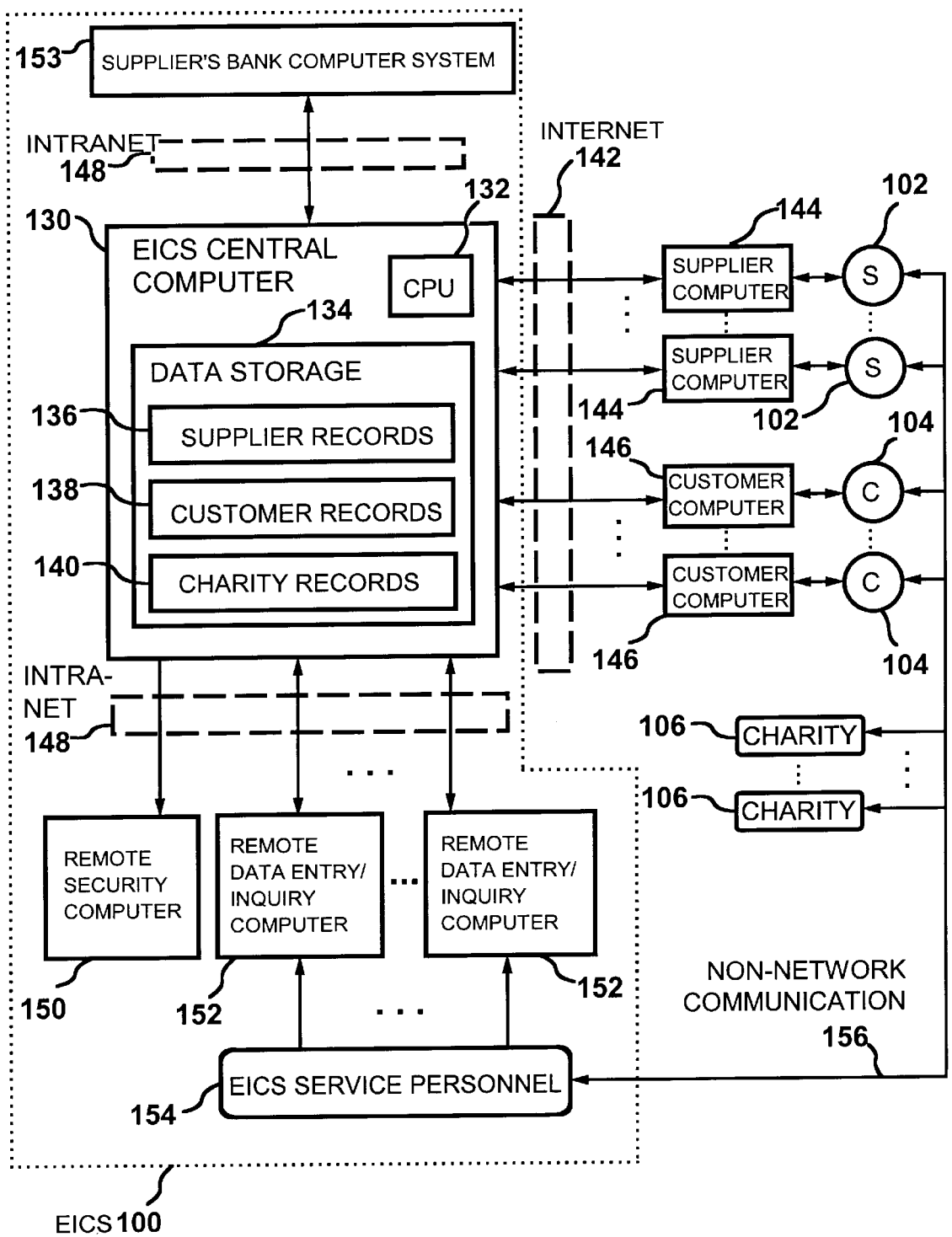
FIG. 11 is a block diagram illustrating a preferred embodiment of the system computer network.

FIG. 11 depicts a preferred embodiment of the elements which comprise the electronic invoicing and collection system working in conjunction with a supplier's bank computer system 153. A central computer 130, for example a Pentium processor based machine, houses a CPU 132 for processing data and a data storage device 134. Data storage device 134 may be a combination of various conventional computer memory devices, such as RAM and ROM chips, hard discs, CD ROM and magnetic tape. Within the data storage device 134 are supplier records 136, customer records 138, and charity records 140. Intranet 148 connects data entry/inquiry computers 152 to central computer 130 which allows human access to records 136, 138, and 140. Through intranet 148 a remote security computer 150 is connected to central computer 130. Security computer 150 mirror copies and saves all transactions using industry standard techniques and serves as a backup data storage device. Intranet 148 is also used to electronically couple central computer 130 to supplier's bank computer system 153.

Still referring to FIG. 11, central computer 130 is electronically coupled to internet 142. In a preferred embodiment, internet 142 is global TCP/IP based and is accessible to supplier 102 and customer 104. Although access to internet 142 by charity 106 would facilitate the system, it is not necessary. A supplier computer 144 used by supplier 102 is connected electronically to internet 142. Supplier 102 may send invoices to central computer 130 via internet 142, or via non-network communication 156 which includes facsimile. Central computer 130 processes invoice information sent by supplier 102, and forwards the information to customer computer 146 which is electronically coupled to internet 142. By virtue of the present invention and current technology, proof of posting would be inherent to the system. Electronic and facsimile invoicing can be done such that security and authenticity is insured, and therefore such precautions are made for all transactions made by EICS 100. Customer 104 receives the information by accessing customer computer 146. If desired, customer 104 is able to respond to EICS 100 or supplier 102 by sending an electronic message through internet 142.

Central computer 130 updates supplier records 136 and customer records 138 by compiling data collected via remote computer 152 (from human data input, such as human data input provided by EICS service personnel 154) and electronic messages. CPU 132 processes active invoice records, monitors billing cycles, mediates financial transactions, calculates surcharges, and sends electronic messages to customer 104 via internet 142 when a payment is overdue. The software necessary for such processing would need little modification from that already available for standard bookkeeping and invoicing.

Depending on which embodiment of the method is followed, customer 104 submits payment to at least one member of the group consisting of EICS 100, supplier 102, and charity 106. When payment is made to supplier 102, and charity 106, verification of payment is sent to EICS 100 by electronic message via internet 142, from the supplier's bank computer system 153 which is coupled to central computer 130 via intranet 148, or by non-network communication 156. Non-network communication 156 may be any standard form of communication, for example, telephone, facsimile, or postal service. Verification of payment is entered into customer record 122. CPU 132 compiles payment behavior data for each customer 104, which EICS 100 uses for assessing customer credit risk and public distribution. CPU 132 also compiles data regarding donations made to charity 106 as well as accounts receivable data of supplier 102.

Figure 12:
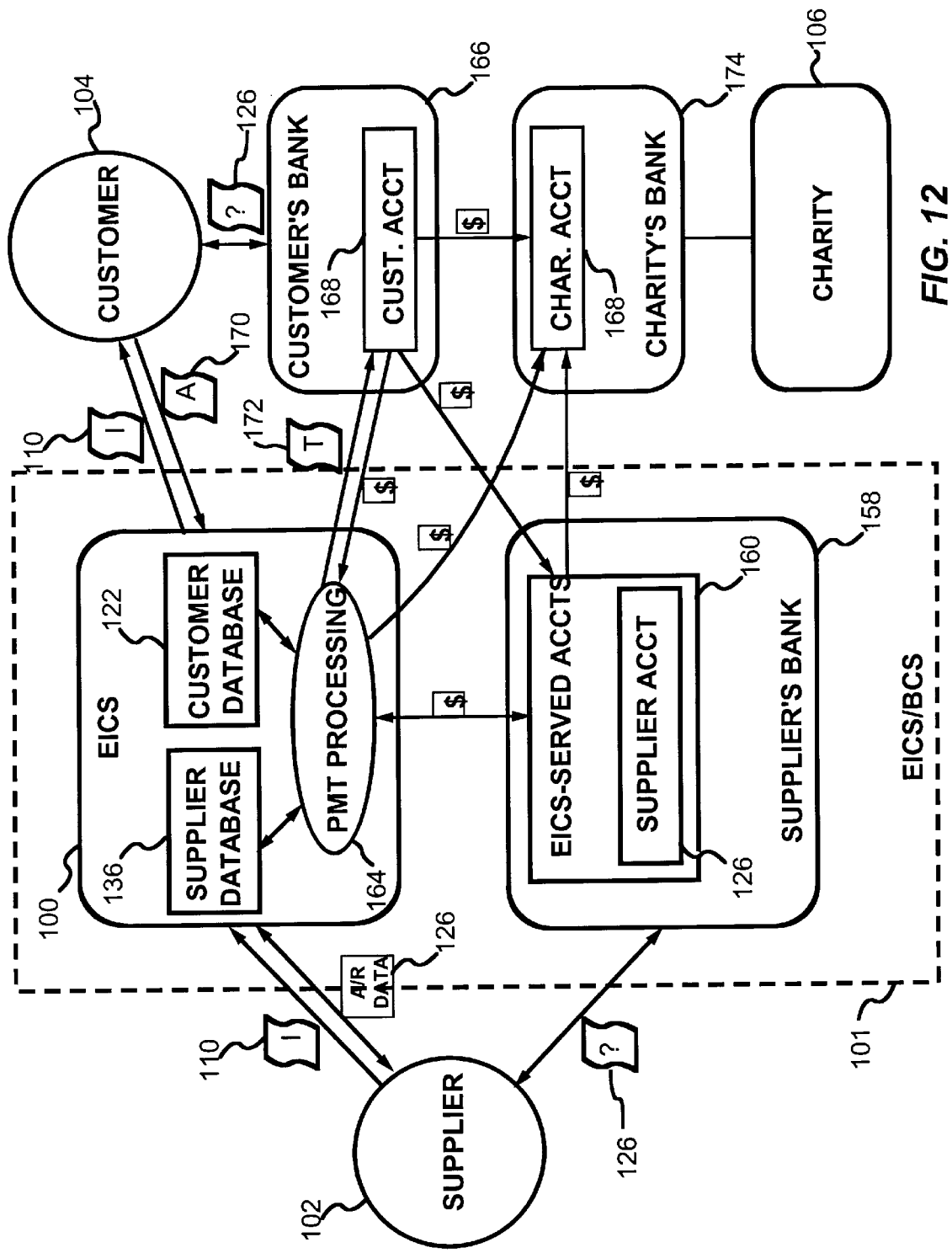
FIG. 12 is a block diagram illustrating a preferred embodiment of the system financial network.

FIG. 12 illustrates an embodiment of the invention in which a supplier's bank 158 licenses EICS 100 or otherwise becomes part of an EICS/bank cooperative system (EICS/BCS) 101. EICS/BCS 101 is a system in which EICS 100 is a server that runs at the supplier's bank 158, and as such all A/R information, payment records, and account information are used in such a way to facilitate all invoicing procedures, financial transactions, account inquiries, and payment inquiries for both EICS 100 and supplier's bank 158. The embodiment illustrated in FIG. 12 illustrates many of the same transactions that were depicted in the EICS 100 method diagrams (FIGS. 1–10), but provides more detail with respect to financial transactions.

In this embodiment, supplier 102 has an account at supplier's bank 158 which participates in EICS/BCS 101. Similar to the previously described embodiments, supplier 102 sends invoices 110 to. EICS 100 regarding services rendered to customer 104. EICS creates supplier database 136 and customer database 122 into which all transaction information is recorded. The databases 136 and 122 are coupled to payment processing facility 164, which keeps track of active invoicing, payments, and financial transactions. The payment processing facility 164 is coupled to EICS-served accounts 160 at supplier's bank 158 as well as other banks, such as the customer's bank 166 and the charity's bank 174. However, it is possible that one or more of a customer 104 or charity 106 uses supplier's bank 158, and such a situation would not affect the system or method of the invention.

EICS 100 invoices customer 104, who may then send payment authorization to EICS 100 or the customer's bank 166. Payment 172 from customer's account 168 is then transferred to the EICS payment processing facility 164, who disburses the funds to the appropriate recipients. For example, customer 104 sends payment authorization 170 to payment processing facility 164, who contacts customer's bank 166. Customer's bank 166 transfers funds to the payment processing facility who determines the allocation of the entire amount which includes the original invoice amount as well as any incurred surcharges. As described by FIG. 13, the disbursement of surcharge 116 is broken into four portions, charity donation 117, EICS service cost 119, supplier inconvenience fee 121, and bank fees 123. Payment processing facility 164 transfers the original invoice amount 114 plus inconvenience fee 121 to supplier's bank account 126 and allocates portions 119 and 121 to EICS/BCS 101.

By virtue of the present invention, supplier's bank 158 works closely with EICS 100 through EICS/BCS 101 and thus has immediate access to supplier A/R information within database 136 and customer payment records 122. Supplier's bank 158 is in a position to accurately assess immediate status of customer 104 and supplier 102, thereby allowing simplified auditing and credit risk assessment of supplier 102 and/or customer 104. Similar access to business records would be available to any financial institution who licenses or otherwise collaborates with EICS 100. Customer payment records 122 are also valuable in that they contain statistical information on interest charges that customer 104 accumulates which may be used as evidence by supplier 102 in future litigation.

SUMMARY, RAMIFICATIONS AND SCOPE

The present invention describes a cost-effective system and method for invoicing and collecting payment from customers that includes incentives for timely payment. The method is designed to curtail customer payment withholding, thereby enabling suppliers the opportunity to increase their working capital. The invention also includes aspects which inherently improve business loaning procedures and business credit assessment, as well as providing a source of philanthropic funds.

A key point in enabling businesses to receive funds from slow paying customers is the increase in leverage that the invention provides. The EICS is simple and cost effective for the supplier, thereby enabling a supplier business of any size to have access to the EICS information processing systems. The invention also provides tools of payment enforcement through third-party intervention in which invoicing and payments are documented. Accounts receivable of participating businesses are thereby complete, accurate, and detailed, thereby enhancing the quality of a supplier's A/R database, invoicing procedures, and payment collection records.

In the described system and method, not only are invoicing procedures simplified for a supplier, but payment incentive is provided for a customer. Because the system monitors all invoice and payment transactions, detailed A/R information is compiled for all participating suppliers and their customers. For businesses who have concerns with public relations, customer payment records made available to the public is significant incentive to maintain a good payment record. Customers will also need to pay their surcharges to avoid bad publicity, since a portion of the surcharge is allocated to charity. An additional payment incentive that the EICS includes is that of credit assessment for individual customers. Because of the detailed payment records that the system compiles, credit worthiness can be assessed accurately by evaluating current and past records. Delinquent customers will suffer financially because they will be put in a high risk bracket in which high penalties for late payment are assigned. In addition, the customer payment history statistics can be used by a supplier against the customer in litigation. Thus non cooperative customers have increased financial and legal incentives to modify their payment behavior.

The detailed payment histories that are compiled by virtue of this invention are useful for reasons other than payment incentive. Business records will be substantially more detailed than those currently available, and another key aspect is that payment records are compiled in real time and can be assessed at any time to reflect the current status of a business. In addition to inspecting customer payment records to determine credit worthiness, supplier A/R data is complete and up-to-date for use in loan assessment. The invention thus encompasses a real time, detailed, and comprehensive payment analysis system with multiple uses described herein.

The system affects various aspects of financing for participating businesses other than payment collection. Specifically, a supplier who enrolls in the EICS at a bank or other financial institution has a distinct advantage when the supplier seeks financing from the bank. By using the EICS, the supplier's A/R histories are timely and complete, and auditing will be simplified for the bank. Banks who license EICS will thereby have a competitive advantage in attracting small business accounts. Factoring companies who cooperate with EICS will attract businesses for this reason as well, but more importantly, the factoring fees can be simply charged to the customers rather than the suppliers. This fact is a major advantage, as factoring fees are generally a large expense to suppliers who use such services. The result of these two improved methods of receiving financing is that the chances of receiving financing is improved for any size business who uses EICS. As such, the system and method results in expedited loan processing.

The present invention provides a multitude of needed advantages for the small supplier, but still creates a simple and cost-effective method for invoicing and payment collection for businesses and entities of any size. Even large companies who have extensive payment processing facilities and information systems will still benefit from other aspects of EICS, such as donating a portion of the surcharges to charity. Thus the above description, examples and advantages should not be construed to limit the scope of the invention, but rather to give a comprehensive illustration of the essence of the invention. To one skilled in the art, variations of the invention will be apparent which modify the invention but do not depart from its intended scope. Thus the scope of the invention should be determined not by the objects and descriptions, but rather by the claims set forth below.

What is claimed is:

1. A method of encouraging payment by a customer to a supplier via an electronic invoicing and collection system, said electronic invoicing and collection system performing the steps of:
   (a) receiving an invoice from said supplier which states a balance that is owed to said supplier by said customer, said invoice including a due date and payment terms which include a late payment surcharge if said invoice is not paid in accordance with said payment terms;
   (b) forwarding said invoice to said customer;
   (c) distributing a payment reminder to said customer if said balance has not been paid in accordance with said payment terms stated in said invoice;
   (d) assessing said surcharge to said customer in the case of late payment;
   (e) assigning a portion of said late payment surcharge to a charitable cause;
   (f) recording payments of said customer made to said invoice and payments made to said charitable cause in order to create a payment history data base,
   whereby said customer is encouraged to make timely payments of balances owed to said supplier by the intervention of said electronic invoicing and collection system, resulting in payment behavior modification.

2. The method of claim 1 wherein the steps of receiving said invoice from said supplier forwarding said invoice to said customer, and distributing said payment reminder to said customer are done electronically via the internet.

3. The method of claim 1 wherein the step of receiving is done by facsimile.

4. The method of claim 1 wherein said surcharge is based on a predetermined percentage of said balance.

5. The method of claim 1 wherein said surcharge is based on a predetermined minimum amount.

6. The method of claim 1 wherein said supplier and said customer are businesses.

7. The method of claim 1 wherein said supplier is a nonprofit organization.

8. The method of claim 7 wherein said charitable cause includes charitable work done by said supplier.

9. The method of claim 1 wherein said charitable cause is chosen by said supplier.

10. The method of claim 1 wherein said charitable cause is chosen by said electronic invoicing and collection system.

11. The method of claim 1 wherein a portion of said surcharge is used for the cost of running said electronic invoicing and collection system.

12. The method of claim 1 wherein a portion of said surcharge is used to pay fees selected from the group consisting of interest charges, factoring charges, and invoice discount charges.

13. The method of claim 1 wherein a portion of said surcharge is used to pay loss of interest in a bank account of said supplier.

14. The method of claim 1 wherein a portion of said surcharge is paid to said supplier.

15. The method of claim 1 wherein said electronic invoicing and collection system operates in conjunction with a financial institution.

16. The method of claim 1 wherein said customer pays said balance to an entity selected from the group consisting of said supplier and said electronic invoicing and collection system.

17. The method of claim 16 wherein said electronic invoicing and collection system pays said supplier said balance that is received from said customer.

18. The method of claim 1 wherein said customer pays said surcharge to an entity selected from the group consisting of said supplier and said electronic invoicing and collection system.

19. The method of claim 18 wherein said charitable cause is paid a predetermined portion of said surcharge by an entity selected from the group consisting of said supplier and said electronic invoicing and collection system.

20. The method of claim 1 wherein said customer pays a predetermined portion of said surcharge to an entity selected from the group consisting of said charitable cause, said supplier, and said electronic invoicing and collection system.

21. The method of claim 1 wherein said electronic invoicing and collection system operates in conjunction with a financial institution.

22. The method of claim 1 wherein said portion of said late payment surcharge is received by said electronic invoicing and collection system and said portion of said surcharge is distributed to said charitable cause through said electronic invoicing and collection system.

23. The method of claim 1 wherein said payment history data base is used by said electronic invoicing and collection system to makes public a list of customers with poor payment histories, whereby additional incentive or prompt payment by said customer is created.

24. The method of claim 1 wherein said payment history database is used by said electronic invoicing and collection system, to provide a credit risk assessment of said customer.

25. An electronic invoicing and collection system for receiving invoices from a supplier, transmitting invoices to a customer, monitoring payment behavior of said customer, assessing late payment surcharges from said customer in the case of late payment, and recording the assignment of a portion of said late payment surcharges to a charitable cause, said electronic invoicing and collection system comprising:
   (a) means for receiving an invoice from said supplier which states a balance that is owed to said supplier by said customer, said invoice including a due date and payment terms which include a late payment surcharge if said invoice is not paid in accordance with said payment terms;
   (b) means for transmitting said invoice to said customer;
   (c) means for monitoring payment by said customer;
   (d) means for computing said late payment surcharge if said payment is not paid in accordance with said payment terms;
   (e) means for computing said portion of said late payment surcharge assigned to a charitable cause;
   (f) data storage means;
   (g) processing means for compiling payment records of said customer; and
   (h) processing means for compiling assignment records of said charitable cause,
   whereby said electronic invoicing and collection system serves as a processing and payment record storage facility for invoicing between said supplier and said customer.

26. The system of claim 25 wherein input of said invoice information is achieved by automated compiling of invoices received electronically by said electronic invoicing and collection system from said supplier.

27. The system of claim 25 wherein input of said invoice information is achieved by human data input through remote data entry means.

28. The system of claim 25 wherein the primary means of communication is by electronic message transmittal through a global TCP/IP based internet system.

29. The system of claim 25 wherein processing means is achieved by a CPU at a central computer.

30. The system of claim 25, further including a remote processor which copies and stores processes carried out at a central computer.

31. The system of claim 25, further including a remote supplier computer for transmitting electronic messages between said remote supplier computer and a central computer.

32. The system of claim 25, further including a remote customer computer for transmitting electronic messages between said remote customer computer and a central computer.

33. The system of claim 25 wherein said electronic invoicing and collection system operates in conjunction with a financial institution.

34. The system of claim 25, further including electronic coupling means to a computer system of a financial institution.

* * * * *